United States Patent

Hobson et al.

(10) Patent No.: US 10,203,995 B2
(45) Date of Patent: Feb. 12, 2019

(54) METHOD OR SYSTEM FOR ACCESS TO SHARED RESOURCE

(71) Applicant: Excalibur IP, LLC, New York, NY (US)

(72) Inventors: Jay Hobson, Fremont, CA (US); Derek Wang, San Jose, CA (US)

(73) Assignee: Excalibur IP, LLC, New York, NY (US)

( * ) Notice: Subject to any disclaimer, the term of this patent is extended or adjusted under 35 U.S.C. 154(b) by 0 days.

(21) Appl. No.: 14/087,937

(22) Filed: Nov. 22, 2013

(65) Prior Publication Data

US 2015/0149737 A1    May 28, 2015

(51) Int. Cl.
*G06F 3/00* (2006.01)
*G06F 5/00* (2006.01)
*G06F 12/00* (2006.01)
*G06F 9/52* (2006.01)

(52) U.S. Cl.
CPC ..................................... *G06F 9/52* (2013.01)

(58) Field of Classification Search
CPC .. G06F 12/00; G06F 12/1458; G06F 12/1466; G06F 12/1475; G06F 9/3891; G06F 9/44563; G06F 17/30165; G06F 17/30171
USPC ...... 710/1, 15, 17, 19, 20, 36; 711/152, 154, 711/159, 163
See application file for complete search history.

(56) References Cited

U.S. PATENT DOCUMENTS

| | | | | |
|---|---|---|---|---|
| 4,763,288 A * | 8/1988 | Deering | ............. | G06F 17/5022 703/19 |
| 5,524,247 A * | 6/1996 | Mizuno | ......................... | 710/200 |
| 6,128,713 A * | 10/2000 | Eisler et al. | ................. | 711/159 |
| 6,633,870 B1 * | 10/2003 | Bradley | ................ | G06Q 10/10 |
| 6,671,707 B1 * | 12/2003 | Hudson | ............... | G06F 12/0269 |
| 7,080,376 B2 * | 7/2006 | Buch | ....................... | G06F 9/526 718/100 |
| 7,844,973 B1 * | 11/2010 | Dice | ........................ | G06F 9/52 707/799 |
| 2003/0120885 A1 * | 6/2003 | Bonola | ................. | G06F 12/023 711/170 |
| 2004/0064656 A1 * | 4/2004 | Hangal et al. | ................ | 711/154 |
| 2004/0260852 A1 * | 12/2004 | Olstad | ..................... | G06F 9/526 710/200 |
| 2005/0177831 A1 * | 8/2005 | Goodman | ............ | G06F 9/3004 718/100 |
| 2005/0229184 A1 * | 10/2005 | Inoue et al. | .................. | 719/310 |
| 2006/0161741 A1 * | 7/2006 | Yasue | ..................... | G06F 9/526 711/152 |
| 2007/0186056 A1 * | 8/2007 | Saha | ....................... | G06F 9/466 711/144 |
| 2008/0005112 A1 * | 1/2008 | Shavit | ..................... | G06F 9/526 |

(Continued)

OTHER PUBLICATIONS

Pro Gradu, "A Pragmatic, Historically Oriented Survey on the Universality of Synchronization Primitives," University of Oulu, Dept. of Information Processing Science, May 11, 2008, 72 pages.

(Continued)

*Primary Examiner* — Farley Abad
*Assistant Examiner* — Henry W Yu
(74) *Attorney, Agent, or Firm* — Berkeley Law & Technology Group, LLP

(57) ABSTRACT

Methods and/or systems are provided that may be utilized to read from or write to a resource, such as a shared memory, for example.

20 Claims, 5 Drawing Sheets

(56) References Cited

U.S. PATENT DOCUMENTS

| | | | |
|---|---|---|---|
| 2008/0059677 A1* | 3/2008 | Archer | G06F 9/4812 710/262 |
| 2008/0320262 A1* | 12/2008 | McKenney et al. | 711/163 |
| 2009/0125548 A1* | 5/2009 | Moir | G06F 9/52 |
| 2009/0287899 A1* | 11/2009 | Li | G06F 9/5016 711/172 |
| 2010/0088476 A1* | 4/2010 | Inagaki et al. | 711/152 |
| 2012/0144138 A1* | 6/2012 | Kandasamy | G06F 9/526 711/163 |

OTHER PUBLICATIONS

"sdbm—The Chicken Scheme wiki," as retrieved on Nov. 21, 2013 from http://wiki.call-cc.org/eggref/4/sdbm, 3 pages.

* cited by examiner

METHOD OR SYSTEM FOR ACCESS TO SHARED RESOURCE

BACKGROUND

1. Field

The subject matter disclosed herein relates to a method or system for access to a shared resource.

2. Information

A shared memory may be accessible to a plurality of applications being executed on a computing device. For example, a shared memory may be accessible to both a word processing application and a web browser application being executed on a computing device. If multiple applications and/or processes, for example, desire to access a common file and/or other resource stored in a common memory at the same time, certain restrictions may be undertaken so that one of the applications and/or processes, for example, may modify the common file and/or other resource at a given time. For example, an application or process may lock a file or other resource (e.g., make it inaccessible to other applications and/or processes) before modifying the file and/or resource.

A lock in this context may comprise a synchronization mechanism to enforce limits on access to a resource in an environment where there are multiple threads, applications and/or processes executing and capable of gaining access to the resource. However, state of the art hardware and/or software approaches have disadvantages.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
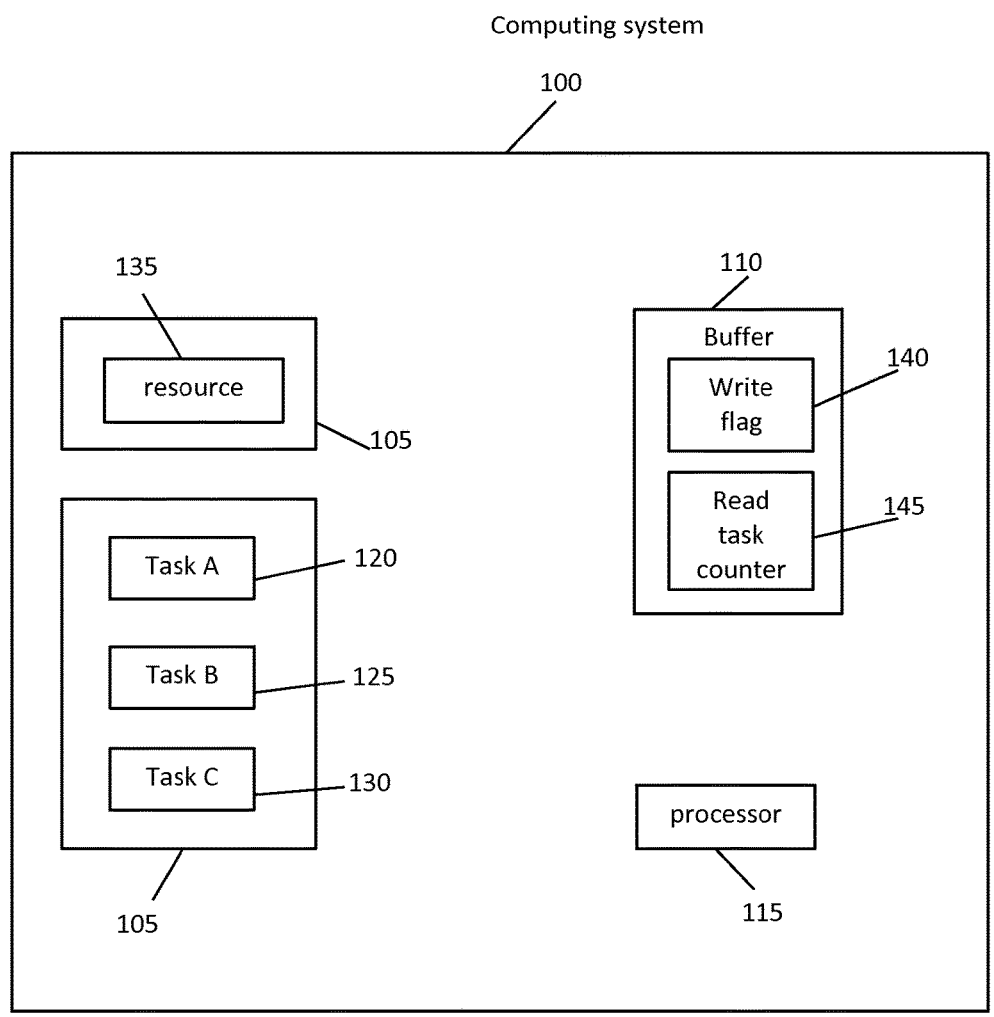
FIG. 1 is a schematic diagram of a computing system according to an embodiment.

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment and/or the like may mean that a particular feature, structure, and/or characteristic described in connection with a particular implementation and/or embodiment may be included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described may be combined in various ways in one or more implementations. In general, of course, these and other issues may vary with context. Therefore, particular context of description and/or usage may provide helpful guidance regarding inferences to be drawn.

As suggested previously, in this context, a shared resource refers to a resource capable of being accessed by more than one process, application and/or thread, such as if the more than one processes, applications and/or threads are executing concurrently, for example. A shared resource may comprise any computing device, networking device and/or service, for example. Examples may include shared printers, shared storage, etc. In this context, the term resource, which may, for example, include memory, peripherals, etc, is understood to refer to a shared resource. Similarly, although a thread, a process or an application may carry different technical attributes or understanding, for these purposes, they are considered sufficiently similar to referred to generically as execution of a task, such as with respect to a resource. Therefore, for convenience, the term task, such as in connection with execution a task, for example, may refer to any of a thread, a process, an application or any combinations therefore, including concurrent execution. Thus, it may also include multiple processes, applications and/or threads, for example. Of course, use in context may provide further guidance as to a particular nuanced meaning.

It is further noted that with advances in technology, it has become more typical to employ distributed computing approaches in which a computational problem may be divided among computing devices, including one or more clients and one or more servers, via a computing and/or communications network. Thus, a shared resource may also be shared via a computing and/or communications network.

A network may comprise two or more network devices and/or may couple network devices so that signal communications, such as in the form of signal packets, for example, may be exchanged, such as between a server and a client device and/or other types of devices, including between wireless devices coupled via a wireless network, for example.

In this context, the term network device refers to any device capable of communicating via and/or as part of a network and may comprise a computing device. While network devices may be capable of sending and/or receiving signals (e.g., signal packets), such as via a wired or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof. Signal packets, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

Operations and/or processing, such as in association with networks, such as computing and/or communications networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and/or similar terms are to be associated with appropriate physical quantities and are intended to merely be convenient labels.

Likewise, in this context, the terms "coupled", "connected," and/or similar terms may be used generically. It should be understood that these terms are not intended as synonyms. Rather, "connected" if used generically may be used to indicate that two or more components, for example, are in direct physical and/or electrical contact; while, "coupled" if used generically may mean that two or more components are in direct physical or electrical contact; however, "coupled" if used generically may also mean that two or more components are not in direct contact, but may nonetheless co-operate or interact. The term coupled may also be understood generically to mean indirectly connected, for example, in an appropriate context.

The terms, "and", "or", "and/or" and/or similar terms, as used herein, may include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms may be used to describe any feature, structure, and/or characteristic in the singular and/or may be used to describe a plurality or some other combination of features, structures and/or characteristics. Though, it should be noted that this is merely an illustrative example and claimed subject matter is not limited to this example. Again, particular context of description and/or usage may provide helpful guidance regarding inferences to be drawn.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures or may be compliant and/or compatible with differing protocols, such as computing and/or communication protocols (e.g., network protocols), may interoperate within a larger network. In this context, the term sub-network refers to a portion or part of a network. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices, but without the communicating devices necessarily specifying one or more intermediate devices and/or may include communicating as if intermediate devices are not necessarily involved in communication transmissions. For example, a router may provide a link or connection between otherwise separate and/or independent LANs. In this context, a private network refers to a particular, limited set of network devices able to communicate with other network devices in the particular, limited set, such as via signal packet transmissions, for example, without a need for re-routing and/or redirecting such network communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. It is understood in this context that a private network may provide outgoing network communications to devices not in the private network, but such devices outside the private network may not direct inbound network communications to devices included in the private network.

The Internet refers to a decentralized global network of interoperable networks that comply with the Internet Protocol (IP). It is noted that there are several versions of the Internet Protocol. Here, the term Internet Protocol or IP is intended to refer to any version, now known or later developed. The Internet includes local area networks (LANs), wide area networks (WANs), wireless networks, and/or long haul public networks that, for example, may allow signal packets to be communicated between LANs. The term world wide web (WWW) and/or similar terms may also be used, although it refers to a sub-portion of the Internet that complies with the Hypertext Transfer Protocol or HTTP. It is noted that there are several versions of the Hypertext Transfer Protocol. Here, the term Hypertext Transfer Protocol or HTTP is intended to refer to any version, now known or later developed. It is likewise noted that in various places in this document substitution of the term Internet with the term world wide web may be made without a significant departure in meaning and may, therefore, not be inappropriate in that the statement would remain correct with such a substitution.

Signal packets, also referred to as signal packet transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address. Although the Internet comprises a network of interoperable networks, not all of those interoperable networks are necessarily available or accessible to the public.

Although physically connecting a network via a hardware bridge is done, a hardware bridge may not typically include a capability of interoperability via higher levels of a network protocol. A network protocol refers to a set of signaling conventions for computing and/or communications between or among devices in a network, typically network devices; for example, devices that substantially comply with the protocol or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance and/or substantial compatibility.

Typically, a network protocol has several layers. These layers may be referred to here as a network stack. Various types of network transmissions may occur across various layers. For example, as one moves higher in a network stack, additional operations may be available by initiating network transmissions that are compatible and/or compliant with a particular network protocol at these higher layers. Therefore, for example, a hardware bridge may be unable to forward signal packets since it may operate at a layer of a network stack that does not provide that capability. Although higher layers of a network protocol may, for example, affect device permissions, user permissions, etc., a hardware bridge, for example, may typically provide little user control, such as for higher layer operations.

A VPN, such as previously described, may enable a remote device to communicate via a local network, but may also have drawbacks. A router may allow network communications in the form of network transmissions (e.g., signal packets), for example, to occur from a remote device to a VPN server on a local network. A remote device may be authenticated and a VPN server, for example, may create a special route between a local network and the remote device through an intervening router. However, a route may be generated and/or also regenerate if the remote device is power cycled, for example. Also, a VPN typically may affect a single remote device, for example, in some situations.

A network may be very large, such as comprising thousands of nodes, millions of nodes, billions of nodes, or more, as examples. Thus, management of shared resources may provide a challenge, whether as part of a computing and/or communications network or within a self-contained system. For example, a computing system may execute or run multiple tasks concurrently or substantially simultaneously. Occasionally, more than one task, for example, may be operative to access a resource concurrently, such as a file stored in system memory. As an example, a scenario may be problematic, for example, if one of the tasks is operable to modify a portion or all of a file if the multiple tasks were to access the same file, or portion thereof, at the same time. To reduce risk of a scenario, such as this example, from occurring, some systems may utilize a lock mechanism or process so that one task at a time is able to modify a file, for example.

Continuing with examples, a computing system may have multiple applications being executed or run substantially simultaneously and/or concurrently, such as a word processing application and a web browser application. In this example, both applications may seek to access the same file at the same time in a shared memory. In a concurrent executing environment, if both applications seek to access a resource (or portion thereof) at substantially the same time or concurrently, such as, for example, to change or write to the resource, it is desirable for one of the applications to be permitted access the resource at a given time to reduce potential for error or conflict from concurrent execution. A lock mechanism may be utilized so that two or more applications, for example, are not able to gain access to the resource substantially simultaneously or concurrently. A lock mechanism may, therefore, be utilized so that while one of the applications accesses the resource, one or more other applications are able to wait to access the resource, in a particular situation, for example.

In a particular embodiment, a lock mechanism may use a mutual-exclusion lock (mutex) or semaphore to keep reader and/or writer tasks from concurrent or substantially simultaneous access (e.g., accessing the same memory location at the same time or virtually the same time). A "lock mechanism" or "lock," as used herein refers to a synchronization mechanism for enforcing limits on access to a resource in an environment where there are or may be multiple tasks of execution capable of accessing the resource. A lock may be designed to enforce a so-called mutual exclusion concurrency control policy. A lock may be utilized, for example, by a Multiplexed Display Buffer Memory (MDBM), typically a hardware component.

A "resource" or "system resource," as used herein may refer to a physical or virtual component of limited availability within a computing or networking system, such as, for example, a computer system. A device, for example, connected to and/or in communication with a computer system may comprise a resource, such as a physical memory or an external peripheral, as examples. An internal system component may also comprise a resource, whether physical or virtual. A virtual system resource may, for example, include files, network connections, and/or portions of virtual memory, for example. Of course, the foregoing are intended as illustrative and non-limiting examples.

A "mutual-exclusion lock" or "mutex," as used herein may refer to a lock utilized to enforce mutual exclusion so that one task, for example, has access to a resource at a particular time. As previously indicated, use of the term task is intended, of course, to encompass threads, processes and/or applications. For example, if a thread attempts to lock a resource via a mutex, the mutex may either "be acquired" by the thread (e.g., if no other thread presently has control of the mutex) or the requesting thread may be "put to sleep"

until the lock is available again (e.g., in case another thread presently has control of the mutex). If there are multiple threads waiting to control a single mutex, an order in which they are "awoken" may be random or at least not specified in some embodiments.

A "semaphore," as used herein may refer another approach to manage access to a resource by multiple tasks and, therefore, may be considered to be a lock or lock-type mechanism; however, typically, a semaphore includes code to manage and/or control access by multiple tasks to a resource, such as in a parallel programming or a multi user environment, for example. A semaphore may be thought of as an operational record of how many units of a particular resource are available, coupled with operations to safely (e.g., without race conditions) adjust that record as units become available, and delay until a unit of the resource becomes available, if none are available currently. A semaphore may allow a pre-set number of tasks (e.g., threads) to access a particular resource, for example, if multiple resources or multiple units of a resource are available. An example might comprise a group of N printers, where N is a whole number.

A "race condition" or "race hazard," as used herein may refer to behavior in which an output signal, for example, may be dependent, at least partially, on a particular sequence and/or particular timing of occurrence of a set of events. Thus, if events do not occur in an order envisioned, such as by a programmer or other system designer, undesirable and/or unexpected results may take place. A "race condition" typically refers to a situation in which two or more signals "race" to influence another signal, such as, for example, an output signal. Race conditions may occur in electronics systems, logic circuits, or in computer software, such as in multithreaded and/or distributed programs, for example. A semaphore may be employed so that a given situation does not produce a race condition, for example, as explained in more detail below, through appropriate synchronization. Semaphores which allow a resource count may be referred to as counting semaphores, whereas semaphores which employ the values 0 and 1 (e.g., unlocked/locked or unavailable/available) may be referred to as binary semaphores.

Distinctions exist between a mutex and a semaphore, typically. A mutex may be utilized for locking a single resource. In contrast, a semaphore may offer an ability to handle a multiplicity of similar resources. For example, a mutex may be released by a thread which has acquired control of the mutex, whereas typically any executing thread may signal a semaphore. More precisely, a thread executing a particular task, for example, may take control of a mutex and release control, in that order, so that conflicting operations do not occur with respect a resource "protected" (e.g., managed) by a mutex.

A semaphore, by contrast, may be utilized in an environment where there are multiple equivalent resources. For example, if there are five equivalent printers in communication with a computing system, there may be five equivalent semaphores capable of locking access to a respective printer if an executing task is accessing the printer so that another task, such as a separate thread, is not capable of accessing the printer while the printer is being accessed by the executing task. This approach reduces risk of conflicting operations from separate tasks for a particular resource. For example, a task operative to print may check for a semaphore available with respect to a printer. In this example, a semaphore may be utilized to obtain a lock on a printer until a document has finished printing. The lock may be released after the printing is complete. Thus, in contrast with a mutex, in which a thread, for example, may take control of a mutex and then release control, a thread executing a particular task, for example, in a system utilizing a semaphore, may typically either signal a resource or wait, but not both, in a particular embodiment.

Semaphores may, for example, be more suitable for handling synchronization. For example, a task 1 may signal or increment a particular semaphore if a "power" button on a keyboard of a computing system is pressed. TA task 2, if the particular semaphore is signaled, may wake a display device of the computing system. In such a scenario, one task (e.g., task 1) comprises a producer of an event signal, whereas the other task (e.g., task 2) comprises a consumer of the event signal via a particular semaphore.

A "process," as used herein may refer to an instance of a computing process, such as one that is being executed by a processor or other computing device and/or that is capable of being executed by a processor or other computing device, for example. A "thread" or "thread of execution," as used herein, may refer to a sequence of programmed instructions that may be executed and managed independently or are capable of being executed and managed independently, such as by computing device. A computing device, as an example, may include an operating system scheduler capable of performing such tasks. A thread may comprise a smallest allowable sequence of executable instructions in an embodiment, such as executable by a computing device, for example. A thread may comprise a light-weight process.

A "light-weight process," as used herein may refer to a technique for achieving multitasking. For example, a light-weight process may be executed and/or may be executable to run in a designated resource space, such as on top of a kernel thread and may share its address space and/or other system resources with other light-weight processes. Multiple threads executing in and/or executable in a designated resource space, e.g., managed by a thread library, may be placed on top of one or more light-weight processes to allow multitasking to be performed, which may result in performance benefits. As indicated previously, the term task may be employed generically to refer to one or more threads, processes, applications, or combinations without loss of generality; however, particular context may likewise provide guidance as to particular intended meaning. Nonetheless, it is understood that particular implementations of threads, processes and/or applications, for example, may differ from one operating system to another. In an embodiment, for example, a thread may be executed within or as part of a process. Multiple threads may be executed within or as part of a given process and may share resources, such as memory, whereas, more typically, different processes may not share resources. Thus, typically, threads of a process that are executing and/or executable may share instructions and/or context, e.g., particular shared values in this example that during execution may be referenced.

A lock mechanism may utilize a mutex or semaphore so that writer and/or reader tasks do not conflict for a portion of a particular memory space at a particular time during execution, for example. Unfortunately, however, lock mechanisms may introduce latency and/or other issues. For example, individual readers may have associated "overhead" in connection with implementation of the lock mechanism. For example, individual accesses that may introduce more latency than may typically be desirable. An alternative to a lock mechanism using a mutex or semaphore may comprise operating in a read-only mode, which may have less latency, but may otherwise block writing to a resource, such as memory.

Although operation in a read-only mode may allow for multiple reads from a resource, read-only mode does not permit one or more writers (e.g., threads executing a task that includes writing to memory) the capability to write to the resource. For example, if a task is operative to update stored memory states of a resource, the task may not be able to do so during read-only mode operation.

Another potential issue associated with a mutex or semaphore is that these approaches typically operate in a manner to obtain a lock prior to a task, whether the task is reading from a resource or the task is writing to a resource. However, obtaining a lock may be an "expensive" operation in terms of time for the computing system, particularly if a lock is not able to be obtained immediately. For example, if a lock is not able to be obtained immediately, a so-called "spin lock," may result for a task to be executed, such as waiting a pre-allocated amount of time or random amount of time, before attempting to obtain the lock again. In an embodiment, a task may have to wait in a queue and until items ahead in the queue have released a lock, before a current task may obtain the lock.

An issue with semaphores or a mutex is that it may be difficult to determine a difference between a read operation and a write operation programmatically. Therefore, if a read operation is being executed, for example, a system may block any task that includes a write operation during execution of the read operation. Similarly, if a write operation is being executed, a semaphore or a mutex may block any task that includes a read operation during execution of the write operation. An issue with a single-lock mutex is that the mutex typically blocks all other tasks from a resource so that if there are two tasks operative to access a resource, one task may be blocked from the resource if another task has control of the mutex, even if reading rather than writing, for example. Thus, latency may occur even as between separate read tasks.

Use of semaphores or mutex may also utilize relatively complex instruction coding, which may be a disadvantage. Typically, this may be the case to reduce risk of conflicting operations being executed concurrently for a given resource. In a cloud computing environment, for example, there may be multiple threads which may attempt to access a resource substantially simultaneously or concurrently. Thus, overall processing throughput may be decreased if a semaphore or mutex is utilized to lock a system resource capable of being accessed by multiple threads.

However, a system, method, or apparatus in accordance with claimed subject matter, such as an embodiment as discussed herein, may reduce overhead for read tasks to be executed in a read-heavy environment, for example, and may also allow write tasks to be executed under appropriate conditions. Likewise, an embodiment may be implemented in a self-contained system, in a networked distributed system, for example, and/or in other system architectures.

In an embodiment, a read task count may be utilized so that write tasks are not capable of accessing a resource during execution of read tasks, such as for system memory, for example, and a shared memory write flag may be utilized so that additional read tasks are not capable of incrementing a read task count while a write task is waiting to access the resource. For example, instead of establishing a lock on a resource to allow a task to read from a resource, in an embodiment, an approach may comprise to permit reading from a resource without necessarily obtaining a lock. For example, if a resource is not currently locked, a read task may access the resource for reading purposes by incrementing a read task counter and, after executing a task that includes read operation, decrementing the read task counter. Accordingly, if a task is operative to write to a resource, the task is capable of evaluating whether other tasks are currently reading from the resource in accordance with a value stored in a read task counter.

Incrementing a counter to permit a read task to execute reading from a resource may be performed in a relatively fast manner. Typically, read instructions are atomic due to simplicity of executing in hardware, for example. Thus, a read task counter may be incremented in one or two microseconds in an implementation. This may provide a faster throughput relative to the time to execute a mutex or semaphore prior to executing a read task, for example. A system in which a lock is set prior to a read operation may be at least an order of magnitude slower. Moreover, some systems may experience additional overhead if read operations to be executed have a risk of interfering with each other. For example, a task include a read operation may block another task operative to perform a read operation, resulting in additional delays in reading from a resource. Likewise, in a cloud environment, network latency may also be an additional factor, adding additional complications if more complex communications between network devices might be involved.

For example, in an embodiment, such as a system or process, for example, overhead may be reduced if there are relatively infrequent write tasks to be executed, so that, while not a read-only environment, performance approaching a read-only environment may be possible while continuing to allow write tasks to be executed. An embodiment as discussed herein may be implemented via software, hardware, or firmware, for example (other than software per se). An embodiment as discussed herein may provide a relatively more efficient system to allow read operations from and write operations to a resource to be executed while reducing risk of conflicting operations. Moreover, an embodiment, such as implementing a task, as discussed herein, may be simpler and/or quicker to execute than approaches that may employ a mutex or semaphore.

FIG. 1 is a schematic diagram of a computing system 100 according to an embodiment. Computing system 100 may include one or more components, such as system memory 105, memory buffer 110, and/or processor 115. There may also be one or more tasks capable of being implemented by processor 115, for example, such as A 120, B 125, and/or C 130, which may be stored in memory as physical states, for example, such as in the form of executable instructions. It is noted that these tasks are provided as a non-limiting illustrative embodiment; however, as discussed, generically, separate tasks are understood to be represented by this illustrative example. System memory 105 may comprise a shared memory accessible by one or more tasks, such as A 120 and/or B 125. System memory 105 may comprise resource 135 in an embodiment. As discussed above, resource 135 may comprise a file or a portion of system memory 105, for example, although claimed subject matter is not limited in scope in this respect. Although resource 135 is shown within system memory 105, it should be appreciated that additional resources may be included within system memory 105, of course. Likewise, in an embodiment, resource 135 may not necessarily comprise a shared portion of system memory.

Memory buffer 110 may include a write flag 130 and a read task counter 145, as illustrated, for example. If the state of write flag 140 is raised or toggled (e.g., set to 1), a task may not be permitted to initiate reading from resource 135. It is, of course, appreciated, that raising or toggling a state of a flag may include a change in binary state, such as a change from 0 to 1 or a change from 1 to 0. However, claimed subject matter is not restricted in scope to a particular initial or default state if consistency is maintained for purposes of operations being executed.

Read task counter 145 may be utilized to maintain a running or real-time total of the number of separate or individual tasks currently reading from resource 135. Read task counter 145 may store a numeral, such as using an integer or floating point format, indicative of a number of tasks currently reading stored states from memory locations of resource 135, for example.

In an embodiment, tasks A 120 may be operative to access resource 135 to read from or write to resource 135. To read from resource 135, task A 120 may check a write flag 140 within memory buffer 110. If, for example, write flag 140 has been raised or toggled, as previously discussed, task A 120 may not read from resource 135 until the write flag has been lowered or again toggled. Again, use of respective terms, here, raising and lowering, are not meant to necessarily only imply a state change from 0 to 1 and from 1 to 0, respectively. For example, a change from 1 to 0 may also be considered raising a flag, in which case, a change from 0 to 1 may also be considering lowering a flag, for consistency. Regardless, toggling refers to a change to an alternate or different state. Therefore, if a binary 1 state is toggled, then the state becomes a binary 0 and if a binary 0 state is toggled then the state becomes a binary 1.

Thus, in an embodiment, if, for example, write flag 140 has not been raised or toggled from an initial state, task A may increment read task counter 145 and read stored states from memory locations of resource 135, in this illustrative example. After reading stored states from resource 135, read task counter 145 may be decremented to indicate that the task has been completed.

If, for example, both task A 120 and task B 125 are operative to read stored states from memory locations of resource 135 concurrently or substantially simultaneously, both tasks may do so, provided that write flag 140 is not toggled at the time the tasks are to be executed and that the tasks increment read task counter 145 prior to reading from resource 135. Upon or relatively soon after completion of reading from resource 135, the completed read tasks may decrement read task counter 145.

If, for example, task C 130 is operative to write to memory locations of resource 135, task C 130 may check write flag 140. If write flag 140 is raised or toggled from a default state, task C 130 may wait until write flag 140 has been re-toggled and its contents represent, again, a default state. If so, (e.g., write flag 140 contents indicate a default state), task C may now toggle flag 140 from a default state. For example, according to one particular embodiment, if a check of write flag 140 indicates write flag 140 has been toggled out of a default state, task C 130 may wait a particular length of time and may check write flag 140 again and continue to do so until write flag 140 has been re-toggled to a default state. In one particular embodiment, task C 130 may wait in a queue, possibly behind one or more other write tasks until the queue have been cleared.

If write flag 140 contents (e.g., state) indicate a default state at the time its contents are checked, task C 130 may toggle the state of write flag 140. After toggling the state of write flag 140, task C 130 may also check a count value (e.g., state) for read task counter 145. If read task counter 145 has a value (e.g., state) other than "0," task C 130 may wait until read tasks counter 145 has a value (e.g., state) of "0," at which point no additional read tasks may be executed while task C executes a write task in connection with resource 135 in this example.

In one particular implementation, task C 130 may toggle write flag 140 so that additional read tasks are not permitted to read from resource 135 even if tasks are still currently reading from resource 135. If there are tasks reading from resource 135 at a time at which write flag 140 is toggled, read task counter 145 has a non-zero value in this particular embodiment, for example. However, after those read tasks are complete, a read task counter eventually should have a value of "0," indicating that there are no tasks reading from resource 135. Thus, task C is able to wait to obtain access and an opportunity to write to resource 135. Upon or after completion of writing to resource 135, write flag 140 may be re-toggled to a default value (e.g., state).

Likewise, if one or more tasks are operative to read from resource 135, but write flag 140 has been toggled from its default value, the tasks may wait until write flag 140 is re-toggled to its default value (e.g., state), at which point the tasks may increment read task counter 145 and may, thereafter, read stored states from memory locations of resource 135.

In one embodiment, a task may directly or indirectly check write flag 140 and may also increment or decrement read task counter 145. For example, an application programming interface (API) may be employed and result in implementation via an API call. Execution of an API may result in a check on the state of write flag 140 and/or may toggle write flag 140. If an API call is issued, the API may locate the write flag and/or counter rather than it being coded as part of the task to be executed, for example. Read task counter 145 may be incremented or decremented via an API call, for example. Read task counter 145 may comprise a shared memory value capable of being modified in an atomic fashion.

FIG. 1, as discussed above, illustrates a computing system 100 in which tasks are operative to read from and/or write to a resource, such as may be stored locally on computing system 100. However, it should be appreciated that in one or more embodiments, one or more tasks may be remote from a resource to be accessed. For example, a task may access a resource stored in a shared memory via a network, such as the Internet. A computing environment may comprise a cloud computing environment, for example.

Figure 2:
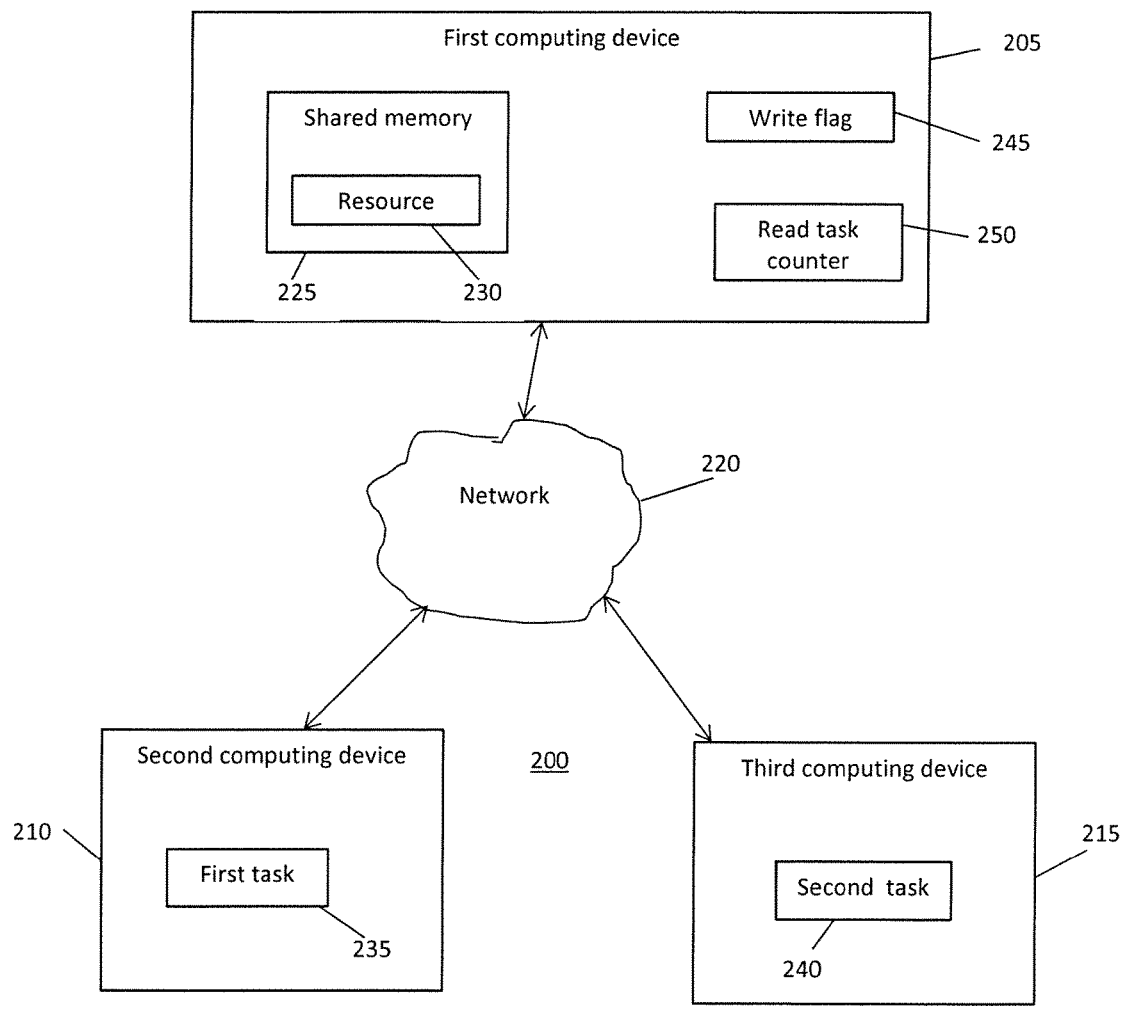
FIG. 2 is a schematic diagram of a computing system according to an embodiment.

FIG. 2 is a schematic diagram of a computing system 200 according to an embodiment. As shown, computing system 200 may comprise a first computing device 205, a second computing device 210, and a third computing device 215. Although three computing devices are illustrated in FIG. 2, it should be appreciated that in an embodiment, more or fewer than three computing devices may be utilized. First computing device 205, second computing device 210, and/or third computing device 215 may be in communication via a network 220, such as the Internet, for example. First computing device 205 may include a shared memory 225 which may include a resource 230. Of course, again, claimed subject matter is not limited in scope to an illustrated example, such as this illustration.

Second computing device 210 may include a task 235 to be executed and third computing device 215 may include a task 240 to be executed. Both tasks may be operative to read stored states from memory locations of resource 230 of first computing device 205. To do so, a task may check a state of a write flag, such as 245. If a state of a write flag is toggled, the tasks may wait until re-toggling of the state of the write flag, at which point the task may increment read task counter 250 and may thereafter read stored states from resource 230. After reading from resource 230, the tasks may decrement read task counter 250.

In another embodiment, as an example, the tasks may be operative to write to resource 230. A task may check the state of a write flag. If the state of the write flag maintains a default state, for example, the state of the flag may be toggled, as previously discussed. Likewise, a task may check a value (e.g., state) of read task counter 250. If a read task counter has a non-zero value (e.g., state), the task may wait. After the counter has a value (e.g., state) of "0," since read tasks are complete, a task may write to resource 230. Upon or after completion of a write operation, the state of write flag 245 may be re-toggled to its default value (e.g., state) signaling that resource 230 is available for tasks that include read operations.

It should be appreciated that although two tasks are shown as being executed in FIG. 2, additional tasks may, of course, be executed in an embodiment. Moreover, multiple tasks may be executed by a particular computing system, such as second computing system 210, in an embodiment. It should additionally be appreciated that one or more tasks executing on a computing device, such as first computing device 205, may likewise be operative to read from and/or write to resource 230. Accordingly, locally-executable and/or remotely-executable tasks may be operative to read from and/or write to a resource. Likewise, as previously described for an embodiment, for example, a status and/or state of memory locations, for example, may be checked directly or indirectly depending, for example, on aspects of a particular embodiment.

Figure 3:
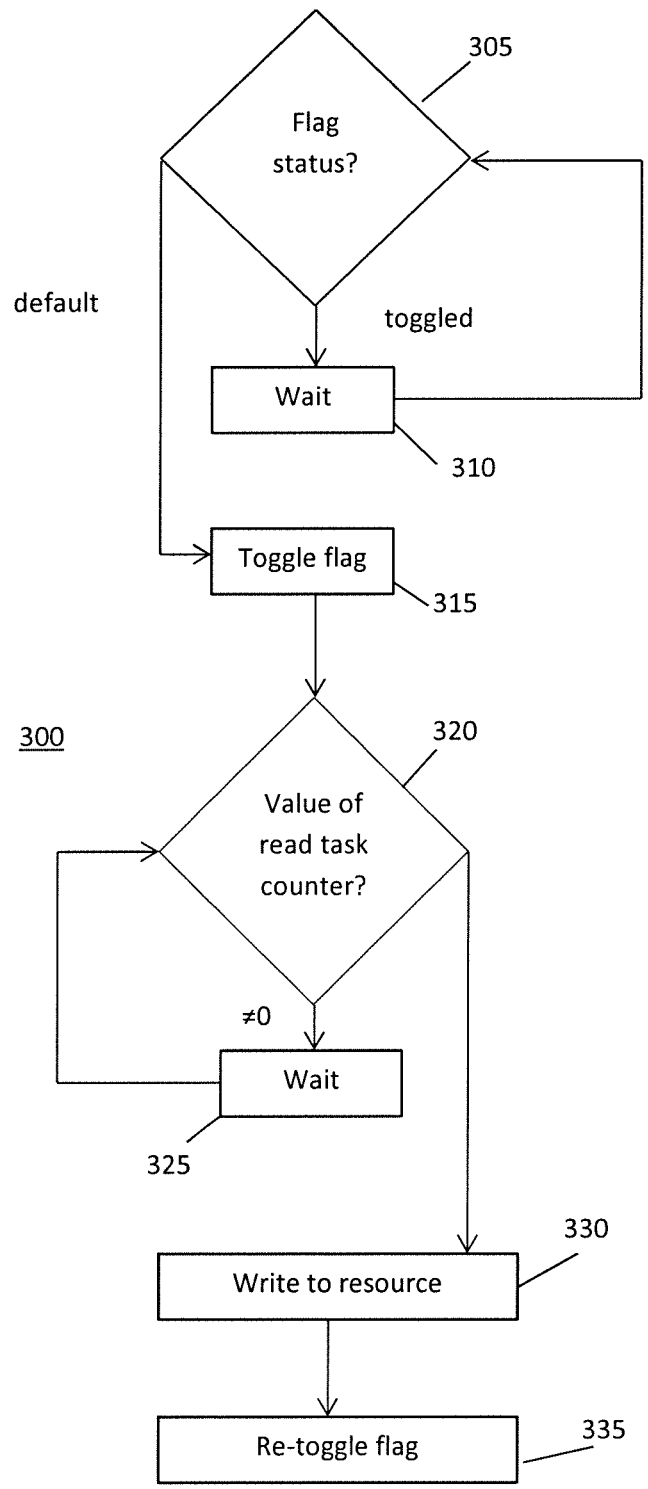
FIG. 3 is a flow diagram of a process to write to a resource according to an embodiment.

FIG. 3 is a flow diagram of a process 300 to write to a resource in accordance with an embodiment. Although, of course, embodiments are intended to be illustrative examples rather than be limiting with respect to claimed subject matter. Likewise, for example, for ease of explanation, an embodiment may be simplified to illustrate aspects or features in a manner that is intended to not obscure claimed subject matter through excessive specificity and/or unnecessary details. Thus, embodiments in accordance with claimed subject matter may include all of, less than, or more than blocks 305-335. Also, the order of blocks 305-335 is merely as an example order.

At block 305, a task, such as a task operative to write to a resource, may check status of a state of a write flag. If a state of a write flag has, for example, been toggled and, therefore, a default value (e.g., state) is not currently stored for the write flag, as indicated in FIG. 3, a task may wait, producing delay in execution, as indicated by block 310. At a later point in time, write flag status (e.g., state) may again be checked, indicated by a loop back to block 305 in this example. However, if a write flag has not been toggled, and currently stores a default state, at 305, a task may advance to block 315. A write flag may be toggled so that it does not store a default value (e.g., state), as illustrated by block 315. Thus, for this embodiment, subsequent tasks, such as tasks including reading operations, may not be able to access the resource until after the state of the write flag has been re-toggled. At block 320, a determination may be made as to whether a read task counter has a value (e.g., state) of "0." If a read task counter does not have a value (e.g., state) of "0," for this particular embodiment, a task operative to write to the resource may wait, illustrated by block 325. A task may wait, producing delay in execution, as indicated. At a later point in time, a counter status (e.g., state) may again be checked, indicated by a loop back to block 320 in this example. On the other hand, if a read counter is determined to have a value (e.g., state) of "0," a task may advance to block 330. A task may write state information to memory locations of the resource for storage, for example. If a write flag has been raised, the write flag may be sufficient for subsequent readers to block. For example, after a read count is back to a value of "0," a writer may become unblocked and may therefore modify a value of a resource.

Upon or after completion of a write operation, a state of a write flag may be re-toggled at block 335 indicating availability of the resource. It is noted that claimed subject matter is not limited in scope to particular types or implementations of waiting or of delays. For example, a delay or wait state may be expressly provided for or may simply comprise an amount of delay associated with progressing to another instruction.

Figure 4:
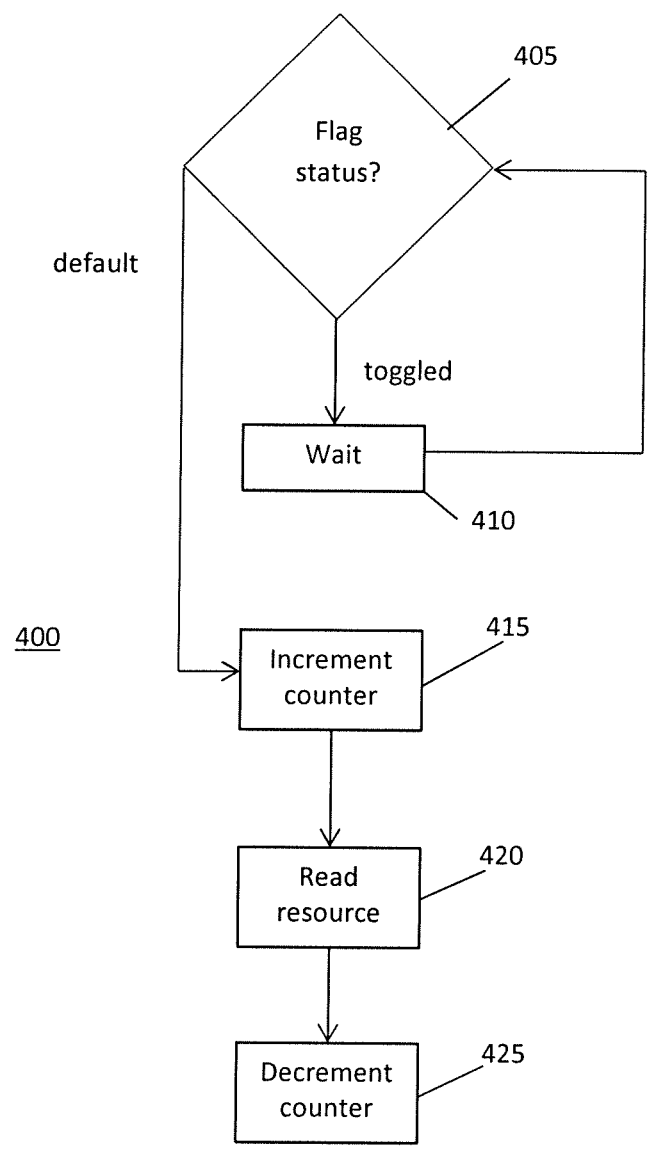
FIG. 4 is a flow diagram of a process to read from a resource according to an embodiment.

FIG. 4 is a flow diagram of a process 400 to read from a resource in accordance with an embodiment. Although, of course, embodiments are intended to be illustrative examples rather than be limiting with respect to claimed subject matter. Likewise, for example, for ease of explanation, an embodiment may be simplified to illustrate aspects or features in a manner that is intended to not obscure claimed subject matter through excessive specificity and/or unnecessary details. Thus, embodiments in accordance with claimed subject matter may include all of, less than, or more than blocks 405-435. Also, the order of blocks 405-435 is merely as an example order.

At block 405, a task, such as a task operative to read from a resource, may check status (e.g., state) of a write flag. If a state of write flag has, for example, been toggled and, therefore, a default value (e.g., state) is not currently stored for the write flag, as indicated in FIG. 4, a task may wait, producing delay in execution, as indicated by block 410. At a later point in time, write flag status (e.g., state) may again be checked, indicated by a loop back to block 405 in this example. However, if a state of write flag has not been toggled, and currently stores a default state, at 405, a task may advance to block 415. A write flag may be toggled so that it does not store a default value (e.g., state), as illustrated by block 415. Thus, for this embodiment, subsequent tasks, such as tasks including reading operations, may not be able to access the resource until after the state of the write flag has been re-toggled. On the other hand, if it is determined that write flag is not been toggled at operation 405, a task may advance to block 415 at which point a read task counter may be incremented. At block 420, a task may read stored states from memory locations of a resource. At block 425, a read counter may be decremented after a read operation is completed. It is again noted that claimed subject matter is not limited in scope to particular types or implementations of waiting or of delays. For example, a delay or wait state may be expressly provided for or may simply comprise an amount of delay associated with progressing to another instruction.

An advantage of embodiments, such as those described, for example, may be that risk of a dead or zombie process locking a resource indefinitely or for an unnecessarily extended period of time may be reduced. This may, for example, allow a task to recover without necessarily performing a system reboot, for example. For example, in some systems, if an error occurs during a task reading from a resource, for example, after the resource has previously been locked, the resource may remain in a locked stated, such as if the task may be stuck in an infinite loop or is otherwise unable to be complete. Accordingly, such a "zombie process" may lock up a resource for a relatively long period of time. As a result, other tasks may be unable to access the resource. However, in an embodiment, it may be known that it may take a certain length of time for a task to perform a read operation at least within a range that is reasonably well specified, for example. Accordingly, if a count of a read counter remains nonzero for a threshold length of time, for example, in which the length of time may be selected to exceed such a range, a processor may determine that a zombie process has occurred and the counter may be decremented so that the resource may become accessible to other tasks. Likewise, in addition to a read operation task, incrementing or decrementing a reader counter may occur relatively quickly, e.g., a small number of microseconds. Accordingly, if count stays at a nonzero value for an extended period of time and, likewise, no other tasks are being performed with respect to the resource, a processor or other unit capable of making such determinations may include programming to determine that a zombie process has occurred and may reset the count to "0," in an embodiment.

Figure 5:
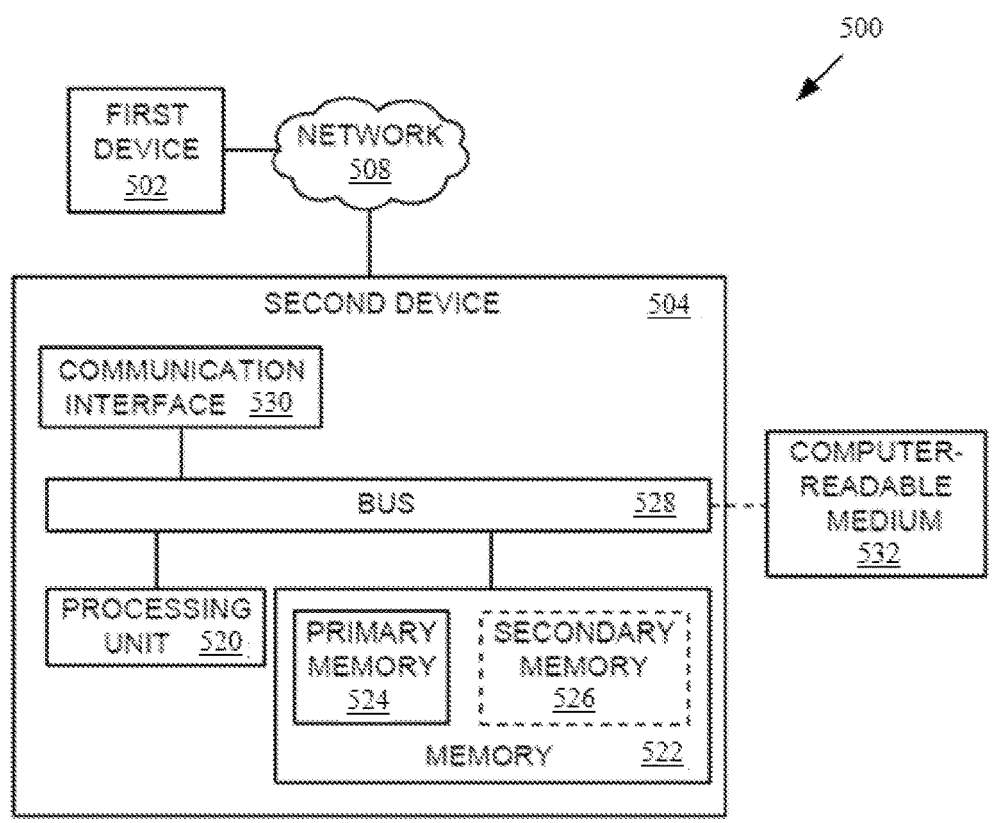
FIG. 5 is a schematic diagram illustrating a computing environment system that may include one or more devices to read from and/or write to a resource.

FIG. 5 is a schematic diagram illustrating a computing environment system 500 that may include one or more devices to read from or write to a resource, such as a shared memory, for example. System 500 may include, for example, a first device 502 and a second device 504, which may be operatively coupled together through a network 508.

First device 502 and second device 504, as shown in FIG. 5, may be representative of any device, appliance or machine that may be capable of exchanging signals over network 508. First device 502 may receive a user input signal, for example, that has been redirected from second device 504. First device 502 may comprise a server capable of transmitting one or more quick links to second device 504. By way of example but not limitation, first device 502 or second device 504 may include: one or more computing devices or platforms, such as, e.g., a desktop computer, a laptop computer, a workstation, a server device, and/or the like, including combinations thereof; one or more personal computing or communication devices or appliances, such as, e.g., a personal digital assistant, mobile communication device, and/or the like, including combinations thereof a computing system and/or associated service provider capability, such as, e.g., a database and/or storage service provider/system, a network service provider/system, an Internet or intranet service provider/system, a portal and/or search engine service provider/system, a wireless communication service provider/system; and/or any combination thereof.

Similarly, network 508, as shown in FIG. 5, is representative of one or more communication links, processes, and/or resources, including combinations thereof, to support exchange of signals between first device 502 and second device 504. By way of example but not limitation, network 508 may include wireless or wired communication links, telephone or telecommunications systems, buses or channels, optical fibers, terrestrial or satellite resources, local area networks, wide area networks, intranets, the Internet, routers or switches, and/or the like, or any combination thereof.

It is recognized that all or part of the various devices and/or networks shown in system 500, and/or the processes and methods as further described herein, may be implemented using or otherwise include hardware, firmware, software, or any combination thereof (other than software per se). Thus, by way of example but not limitation, second device 504 may include at least one processing unit 520 that is operatively coupled to a memory 522 through a bus 528. Processor 520 is representative of one or more circuits to perform at least a portion of a computing procedure and/or process. By way of example but not limitation, processing unit 520 may include one or more processors, controllers, microprocessors, microcontrollers, application specific integrated circuits, digital signal processors, programmable logic devices, field programmable gate arrays, and the like, or any combination thereof.

Memory 522 is representative of any storage mechanism. Memory 522 may include, for example, a primary memory 524 and/or a secondary memory 526. Primary memory 524 may include, for example, a random access memory, read only memory, etc. While illustrated in this example as being separate from processing unit 520, it should be understood that all or part of primary memory 524 may be provided within or otherwise co-located/coupled with processing unit 520.

Secondary memory 526 may include, for example, the same or similar type of memory as primary memory and/or one or more storage devices or systems, such as, for example, a disk drive, an optical disc drive, a tape drive, a solid state memory drive, etc. In certain implementations, secondary memory 526 may be operatively receptive of, or otherwise able to couple to, a computer-readable medium 532. Computer-readable medium 532 may include, for example, any medium that can carry and/or make accessible data signals, code and/or instructions for one or more of the devices in system 500.

Second device 504 may include, for example, a communication interface 530 that provides for or otherwise supports operative coupling of second device 504 to at least network 508. By way of example but not limitation, communication interface 530 may include a network interface device and/or card, a modem, a router, a switch, a transceiver, and/or the like, including combinations thereof.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method comprising:
  performing read and write operations on a non-locked portion of a sharable memory, the performing the read and write operations comprising:
    determining a state of a flag for the non-locked portion of the sharable memory;
    at least partially in response to determining that the state of the flag comprises a default state, incrementing a counter tracking a number of concurrent tasks accessing the non-locked portion of the sharable memory;
    accessing the non-locked portion of the sharable memory to execute a portion of a first particular task involving reading from the non-locked portion of the sharable memory at a time at which the non-locked portion of the sharable memory is accessible to more than one of the concurrent tasks to perform one or more read operations on the non-locked portion of the sharable memory at least partially in response to evaluating whether other tasks are currently performing one or more read operations from the non-locked portion of the sharable memory based, at least in part, on a value stored in the counter;
    decrementing the counter tracking the number of concurrent tasks accessing the non-locked portion of the sharable memory after completion of the portion of the first particular task;
    at least partially in response to determining that the state of the flag comprises a non-default state, waiting to execute one or more portions of at least a second particular task involving access to the non-locked portion of the sharable memory until the state of the flag is changed to comprise the default state;
    accessing the non-locked portion of the sharable memory location comprising a third particular task; and
    wherein at least partially in response to determining that the state of the flag comprises the default state and that the third particular task involves writing to the non-locked portion of the shared memory:
      toggling the state of the flag to the non-default state, and
      waiting to perform the third particular task until the counter tracking the number of concurrent tasks has a value of zero.

2. The method of claim 1, the reading from the non-locked portion of the sharable memory comprises reading state information stored in memory locations of the non-locked portion of the sharable memory.

3. The method of claim 2, wherein after the state of the flag comprises the default state by re-toggling,
  incrementing a counter tracking the number of concurrent tasks reading the non-locked portion of the sharable memory;
  accessing the portion of the sharable memory to execute the portion of the first particular task involving reading; and
  decrementing the counter tracking the number of concurrent tasks reading the non-locked portion of the sharable memory after completion of the number of concurrent tasks.

4. The method of claim 1, the method further comprising:
  toggling the state of the flag to the non-default state;
  determining a value of the counter tracking the number of concurrent tasks accessing the portion of the sharable memory; and
  writing state content to memory locations of the non-locked portion of the sharable memory at least partially in response to the value of the counter comprising a zero value, or waiting until the value of the counter comprises a zero value and then writing to the non-locked portion of the sharable memory.

5. The method of claim 1, wherein the counter comprises an integer counter.

6. The method of claim 1, wherein the counter comprises a floating point counter.

7. The method of claim 1, further comprising issuing an application programming interface (API) call to determine the state of the flag.

8. The method of claim 1, wherein the accessing is capable of being performed over a network by a device located remote from the non-locked portion of the sharable memory.

9. A system, comprising:
  a sharable memory, a write flag, a read task counter to track one or more concurrent tasks to access a non-locked portion of the sharable memory; and
  a processor to perform read and write operations on the non-locked portion of the sharable memory, the perform of the read and write operations to comprise to toggle a state of the write flag, increment or decrement the task counter, and read from or write to the non-locked portion of the sharable memory in accordance with an execution of one or more threads concurrently;
  wherein at least partially in response to a determination that the state of the write flag is to comprise a default state to permit a number of concurrent tasks to perform one or more read operations to read from the non-locked portion of the sharable memory at a particular time at least partially in response to an evaluation of an existence of a current performance of other tasks to perform one or more read operations from the non-locked portion of the sharable memory to be based, at least in part, on a value to be stored in the counter;
  wherein at least partially in response to a change in the state of the write flag from a default to a non-default state while the portion of the sharable memory is to be unlocked, the processor to wait to execute one or more portions of at least a particular task in which the non-locked portion of the sharable memory is to be accessed until the state of the write flag is changed to comprise the default state; and wherein in response to a determination that the state of the write flag is to comprise the default state and a third particular task is to involve a write operation to the non-locked portion of the shared memory, the processor to toggle the state of the flag to the non-default state and to wait to perform the third particular task until the counter tracking the number of concurrent tasks has a value of zero.

10. The system of claim 9, wherein the processor is to execute multiple concurrent threads to read from the non-locked portion of the sharable memory concurrently if the state of the write flag is to comprise the default state to indicate no threads are to be written to the sharable memory.

11. The system of claim 10, wherein the processor is to execute a thread to write to the non-locked portion of the sharable memory if the state of the write flag is to comprise the non-default state and a value of the read task counter is to comprise zero.

12. The system of claim 9, wherein the processor is to issue an application programming interface (API) call to determine the state of the write flag.

13. The system of claim 9, wherein the sharable memory is to be local to the processor.

14. The system of claim 9, wherein the sharable memory is to be remote from the processor and is to be accessible via a network.

15. An article, comprising:
a non-transitory storage medium comprising machine-readable instructions executable by a special purpose apparatus to permit a particular task access to a non-locked portion of a sharable memory to be capable of being accessed by multiple tasks concurrently with respect to the sharable memory,
wherein the instructions are further executable by the special purpose apparatus to: determine a state of a flag for the non-locked portion of the sharable memory; and
at least partially in response to performance of read and write operations on the non-locked portion of the sharable memory and a determination that the state of the flag is to comprise a default state: to increment a counter to track a number of concurrent tasks to access the non-locked portion of the sharable memory; to access the non-locked portion of the sharable memory to execute a portion of a particular task to read from the non-locked portion of the sharable memory at a time at which the non-locked portion of the sharable memory is accessible by more than one of the concurrent tasks to perform one or more read operations at least partially in response to an evaluation of an existence of a current performance of other tasks to perform one or more read operations from the non-locked portion of the sharable memory to be based, at least in part, on a value to be stored in the counter;
decrement the counter after completion of a portion of the particular task; and
at least partially in response to a determination that the state of the flag is to comprise a non-default state: to wait until the state of the flag is to be changed to comprise the default state;
access the non-locked portion of the sharable location to comprise an additional particular task while the non-locked portion of the sharable memory is to be unlocked; and
wherein at least partially in response to a determination that the state of the flag is to comprise the default state and a determination that the additional particular task is to involve a write operation to the non-locked portion of the shared memory:
toggle the state of the flag to the non-default state, and
wait to perform the additional particular task until the counter tracking the number of concurrent tasks has a value of zero.

16. The article of claim 15, wherein the instructions, to read from the non-locked portion of the sharable memory, are further executable by the special purpose apparatus to read state content to be stored in memory locations of the sharable memory.

17. The article of claim 16, wherein the instructions are further executable by the special purpose apparatus to re-toggle the state of the flag so that the flag is to comprise the default state; and further executable to: increment a counter to track the number of concurrent tasks to read from the non-locked portion of the sharable memory; read from the non-locked portion of the sharable memory; and decrement the counter after completion of the read operation.

18. The article of claim 15, wherein the instructions are further executable by the special purpose apparatus to: toggle the state of the flag so that it is no longer a default state; determine the state of a counter to track the number of concurrent tasks to access the non-locked portion of the sharable memory; write state content to memory locations of the portion of the sharable memory if a value of the counter is to comprise a zero value; and otherwise wait until the state of the counter is to comprise a zero value and then to write to the non-locked portion of the sharable memory.

19. The article of claim 15, wherein the instructions are further executable by the special purpose apparatus to issue an application programming interface (API) call to determine the state of the flag.

20. The article of claim 15, wherein the instructions are further executable by the special purpose apparatus to access the non-locked portion of the sharable memory over a network remote from the special purpose apparatus.

* * * * *